Aug. 12, 1969  B. D. HENDERSON  3,460,880
POINT ILLUMINATION AND SCANNING MECHANISM FOR MICROSCOPES
Filed Dec. 18, 1964
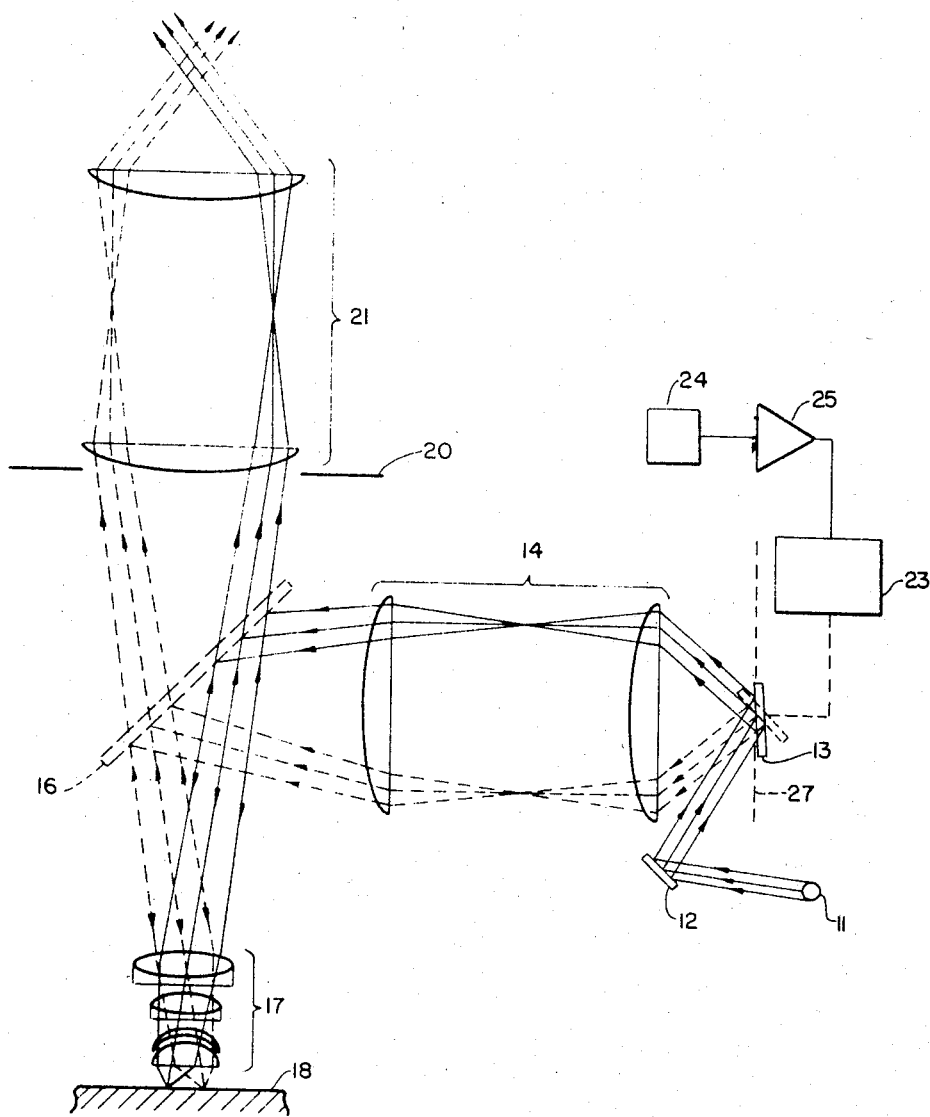
*INVENTOR.*
BILLIE D. HENDERSON
BY
ATTORNEY United States Patent Office 3,460,880
Patented Aug. 12, 1969

3,460,880
POINT ILLUMINATION AND SCANNING
MECHANISM FOR MICROSCOPES
Billie D. Henderson, La Habra, Calif., assignor to Beckman Instruments, Inc., a corporation of California
Filed Dec. 18, 1964, Ser. No. 419,533
Int. Cl. G02b 17/08
U.S. Cl. 350—6
7 Claims

ABSTRACT OF THE DISCLOSURE

There is disclosed a microscope illuminating system in which there may be provided on the stage of a microscope a point of illumination which may be as small as 1 micron and which may be scanned across the stage. A galvanic mirror is positioned adjacent the microscope ocular at the exit pupil and illuminated by a point source of preferably collimated radiation. The galvanic mirror may be driven such that the angle of incidence of the radiation on the ocular reflected from the mirror is changed. Radiation from the ocular passes the microscope objective and illuminates an area on the stage which is approximately equal to the source size divided by the magnification of the microscope system from stage to source. A dichroic or half-silvered mirror is provided such that radiation emitted or reflected from the microscope stage may be examined either visually with a second ocular or photometrically with or without the ocular.

This invention generally relates to the illumination of the stage of a microscope and more particularly to the illumination of a point on the stage within the field of view of the microscope by means of apparatus which allows the point of illumination to be moved in at least one direction whereby at least a portion of the field of view of the stage may be scanned.

In certain instances it is desirable to examine only a very limited area in the total field of view of a microscope. Particularly in instances of photometric examinations of such small areas, full field illumination of the stage creates scattered and fluorescent radiation from areas other than that which is to be examined interfering with the examination of the particular area of interest. By illuminating only a very small area within the field of view of the microscope interfering scattered and fluorescent radiation from other areas is substantially eliminated. Further, where examination of tagged microorganisms is being made photometrically, certain tagging materials deteriorate so rapidly under full field illumination that the tagging material becomes ineffective before the examination can be completed.

It is, therefore, an object of the present invention to provide an apparatus for use with a conventional microscope which may be utilized to illuminate a very limited area in the total field of view of a microscope.

Another object is to provide an apparatus for illuminating a limited area on the stage of a microscope that is small compared to the total field of view of the microscope and in which the illuminated zone may be moved within the field of view.

Another object is to provide an apparatus for scanning a point of illumination over the stage of a microscope within the field of view thereof which may be utilized with conventional microscopes without substantial modification thereof.

Still another object is to provide an apparatus for illuminating a very limited area of the total field of view on the stage of a microscope by illuminating the area through the exit pupil of the microscope whereby said area may be examined without substantial interference from radiation from the remaining field of view.

Other objects and many of the attendant advantages of the present invention will become more readily appreciated as the same becomes better understood by reference to the following detailed description when considered in connection with the accompanying drawing in which the single figure is a schematic diagram of one preferred embodiment of a point illuminator and scanning mechanism for a conventional microscope constructed according to the teachings of this invention.

Referring now to the figure, exciting radiation from any suitable source 11 is reflected from fixed mirror 12 to a movable reflecting element 13. Radiation from the movable reflecting element is directed to an ocular 14 of a conventional microscope. Radiation passing through the ocular is reflected from a dichroic or half-silvered mirror 16 through the microscope objective lens 17 and is focused on the microscope stage 18. Radiation from any emitting or reflecting material on the microscope stage upon which the exciting radiation is focused is passed by the microscope objective lens 17 through the dichoric or half-silvered mirror 16 to an exit opening in the microscope indicated by line 20 which may include, if desired, a second ocular 21. Reflecting element 13 may conveniently comprise a galvanometer mirror angularly positioned by means of an electromagnetic drive 23 powered from a signal source 24 through amplifier 25.

The exit pupil of the microscope system is represented by the dashed line 27. When illuminating the microscope stage through the ocular, the exit pupil 27 becomes the entrance pupil of the system although to be consistent with conventional terminology, the pupil of ocular 14 will be termed hereafter the exit pupil. All rays passing through the exit pupil of the system also pass through the objective lens. Galvanometers having extremely small mirrors are commercially available, one such mirror being approximately 0.030 x 0.060 inches in size. This small galvanometer mirror can be accurately positioned in the exit pupil of the ocular lens. By angularly driving the galvanometer mirror, the angle of incidence of the rays on the ocular is changed thus changing the position on the microscope stage of the area illuminated by the exciting radiation. The illuminated area size on the stage is the source size divided by the magnification of the microscope system from stage to source. By providing an optical stop within the system such that a near point source of substantially collimated radiation is provided, the image size of the source on the microscope stage may be made less than 1 micron. This optical stop may be provided either by limiting the size of the source or by masking a large source with a mask having a pin hole therein.

Various mercury and xenon lamps are commercially available which provide an extremely small source of wide bandwidth, intense radiation. For example, one such mercury arc lamp, Model 110, produced by P.E.K. Labs Inc. of Sunnyvale, Calif., produces an arc of approximately 0.012 inches in diameter. When utilizing this source no other mask is needed. If a 10X ocular and a 100X objective are utilized, the image of a source on the microscope stage is ideally 1/1000 as large as the source and in the case of the Model 110 is approximately 0.3 micron. However, optical diffraction increases the image size but direct measurement has confirmed that this image size is less than 1 micron. As the angular position of mirror 13 is changed in the exit pupil the angle of incidence on the ocular 14 of radiation reflected from the mirror is changed and the position of the source image on the microscope stage is likewise changed as is illustrated by the dashed lines. By driving the mirror in one direction such, for example, as with an electrical sawtooth signal generator, the entire field of view of the objective may be scanned in that direction and if the stage is moved at a right angle thereto, a strip on the microscope stage may be scanned.

Utilizing the system hereinbefore described a 1 micron zone within the field of view of the microscope, which is generally 100 microns, can be illuminated and examined through the exit opening. This examination may be done visually by means of a second ocular or photometrically with or without the ocular. The system herein described has particular advantage when examination is being made photometrically since radiation emitted or reflected to the exit opening is substantially limited to the illuminated point and no interference by scattered or fluorescent light from other areas of the field occurs. As has been pointed out, the utilization of the second ocular is not essential for photometric examination but has the advantage when a photomultiplier is used as a detector that the photocathode can be placed in the plane of the pupil of the ocular and radiation is then directed to a single point on the photocathode regardless of the position of the illuminated area within the field thus eliminating changes in sensitivity over the cathode area.

It should be apparent that if a half-silvered mirror is utilized approximately 50% of the exciting or emitted or reflected radiation is lost. Further, it should be understood that the system may be arranged such that the exciting radiation is passed by the mirror and radiation returning from the stage is reflected.

In instances where it is desired to examine the transmission characteristics of the sample on the microscope stage, the detector is placed beyond the stage in the path of radiation passing therethrough. It is the general practice in such a case to utilize a condenser lens and an auxiliary lens to image the condensor lens onto the detector. In such a system, it is obvious that the dichroic or half-silvered mirror may be illuminated.

There has been illustrated and described apparatus for illuminating a point area on the stage of a microscope and moving the point in at least one direction within the field of view such that at least a portion of the stage may be scanned. The apparatus may be utilized with most conventional microscopes with little or no modification of the microscope. Obviously many modifications and variations of the preferred embodiment illustrated are possible and will be apparent to those skilled in the art in light of the foregoing teachings.

What is claimed is:

1. A scanning mechanism for illuminating the stage of a microscope with a point of radiation comprising:
    reflecting means positioned at the exit pupil of the microscope to direct radiation to an ocular thereof;
    means connected to said reflecting means for varying the angle of incidence on said ocular of radiation reflected from said reflecting means; and
    radiation source means providing substantially a point source of substantially collimated radiation positioned to direct said radiation on said reflecting means whereby the point of radiation on said stage is approximately the area of said collimated radiation divided by the magnification of said microscope and the position of said point of radiation on said stage may be varied by varying the angle of said mirror.

2. A scanning mechanism for scanning the stage of a microscope comprising the combination of:
    a microscope having at least one ocular and at least one objective;
    reflecting means positioned at the exit pupil of said microscope for directing radiation to said ocular; and
    means connected to said reflecting means for changing the angle of incidence on said ocular of radiation reflected from said reflecting means whereby the area of said point of radiation on the stage of said microscope is approximately the area of the source of radiation reflected by said reflecting means divided by the magnification of said microscope and the position of said point of radiation on the stage of said microscope may be varied by varying the angle of said reflecting means.

3. A scanning mechanism for scanning the stage of a microscope comprising the combination of:
    a microscope having at least first and second oculars and at least one objective;
    reflecting means positioned at the exit pupil of said microscope for directing radiation to said first ocular;
    means connected to said reflecting means for changing the angle of incidence on said first ocular of radiation reflected from said reflecting means; and
    means receiving radiation from the stage of said microscope and reflecting at least a portion of said radiation to said second ocular.

4. A scanning mechanism for scanning the stage of a microscope comprising the combination of:
    a microscope having at least one ocular, at least one objective and an exit opening;
    reflecting means positioned at the exit pupil of said microscope for directing radiation to said ocular;
    means connected to said reflecting means for changing the angle of incidence on said ocular of radiation reflected from said reflecting means; and
    means positioned within said microscope between said ocular and said objective for passing at least a portion of the radiation from said ocular through said objective to the stage of said microscope and for passing at least a portion of radiation transmitted from said stage through said objective to said exit opening.

5. A scanning mechanism for scanning the stage of a microscope comprising the combination of:
    a microscope having at least one ocular, at least one objective and at least one exit opening;
    radiation source means providing substantially a point source of substantially collimated radiation;
    reflecting means positioned to receive radiation from said radiation source means and direct said radiation to said ocular, said reflecting means including at least one reflecting element positioned at the exit pupil of the microscope;
    means connected to at least said one reflecting element for changing the angle of incidence on said ocular of radiation reflected from said reflecting element; and
    means passing at least a portion of radiation received from the stage of the microscope through said objective to said exit opening.

6. A scanning mechanism for scanning the stage of a microscope comprising the combination of:
    a microscope having first and second oculars and at least one objective;
    a galvanometer mirror means positioned at the exit pupil of said first ocular for varying the angle of incidence on said ocular of radiation reflected from said mirror means;
    a radiation path from said first ocular to said objective for passing radiation from said ocular to said objective;
    a second radiation path from said objective to said second ocular for passing radiation from the stage of said microscope to said second ocular;
    radiation source means for directing radiation from said source means to said galvanometer mirror means; and
    optical stop means providing substantially collimated radiation at said exit pupil.

7. A scanning mechanism for scanning the stage of a microscope comprising the combination of:
    a microscope having at least one ocular and one objective;
    radiation source means;
    reflecting means positioned to receive radiation from said radiation source means and direct said radiation to said ocular, said reflecting means including at least one reflecting element positioned at the exit pupil of said ocular;

means connected to at least said one reflecting element for changing the angle of incidence on said ocular of radiation reflected from said reflecting element; and means receiving radiation transmitted through the stage of said microscope.

References Cited

UNITED STATES PATENTS

| | | | |
|---|---|---|---|
| 2,146,506 | 2/1939 | Maisch | 350—87 |
| 2,692,370 | 10/1954 | Moore | 350—7 X |
| 3,036,491 | 5/1962 | Schier | 88—14 |

OTHER REFERENCES

Dowbrowolski, Measurement of the Diameter of Opaque Cylinders by Scanning Microscopy, 47 J. Optical Soc'y of America 186–90 (1957).

DAVID H. RUBIN, Primary Examiner

U.S. Cl. X.R.

350—91, 237